(12) United States Patent
Logan et al.

(10) Patent No.: US 7,089,188 B2
(45) Date of Patent: Aug. 8, 2006

(54) METHOD TO EXPAND INPUTS FOR WORD OR DOCUMENT SEARCHING

(75) Inventors: Beth T. Logan, Somerville, MA (US); Jean-Manuel Van Thong, Arlington, MA (US); Pedro J. Moreno, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 10/108,534

(22) Filed: Mar. 27, 2002

(65) Prior Publication Data
US 2003/0187649 A1 Oct. 2, 2003

(51) Int. Cl.
*G10L 13/08* (2006.01)
(52) U.S. Cl. .................. 704/270; 704/260; 704/277
(58) Field of Classification Search ............... 704/260, 704/3, 243, 4
See application file for complete search history.

(56) References Cited

U.S. PATENT DOCUMENTS

| | | | | |
|---|---|---|---|---|
| 4,499,553 | A | 2/1985 | Dickinson et al. | 364/900 |
| 5,265,065 | A | 11/1993 | Turtle | 395/600 |
| 5,278,980 | A | 1/1994 | Pedersen et al. | 395/600 |
| 5,500,920 | A * | 3/1996 | Kupiec | 704/270.1 |
| 5,745,899 | A | 4/1998 | Burrows | 707/102 |
| 5,799,276 | A * | 8/1998 | Komissarchik et al. | 704/251 |
| 5,907,839 | A | 5/1999 | Roth | 707/5 |
| 6,032,164 | A * | 2/2000 | Tsai | 715/533 |
| 6,101,492 | A | 8/2000 | Jacquemin et al. | 707/3 |
| 6,219,453 | B1 | 4/2001 | Goldberg | 382/220 |
| 6,269,335 | B1 | 7/2001 | Ittycheriah et al. | 704/270 |
| 6,598,039 | B1 * | 7/2003 | Livowsky | 707/3 |
| 6,684,185 | B1 * | 1/2004 | Junqua et al. | 704/243 |

FOREIGN PATENT DOCUMENTS

WO    WO 97/38376    * 10/1997

OTHER PUBLICATIONS

Milton, "Spellchecking by computer" 1996, Journal of the Simplified Spelling Society, vol. 29, No. 1, 1996, pp. 4-11.*
Singhal, "AT&T at TREC-7" Proc. of the Seventh Text Retrieval Conference, pp. 239-252, Jul. 1999.*
Porter, M. F., "An Algorithm For Suffix Stripping," Program, 14(3), pp. 130-137, (Jul. 1980).
Gusfield, Dan, "Core String Edits, Alignments, and Dynamic Programming." In *Algorithms on Strings, Trees, and Sequences,* University of California, Davis (Cambridge University Press), pp. 215-223 (1997).
Singhal, A., et al., *AT&T at TREC-6: SDR Track,* pp. 1-6, Nov. 1997.

(Continued)

*Primary Examiner*—V. Paul Harper

(57) ABSTRACT

An electronic document searching system or word searching system which when given an input, expands the input as a function of acoustic similarity and/or word sequence occurrence frequency. Results of the system are alternative input words or phrases. The alternative input words or phrases are output from the system for further processing.

32 Claims, 12 Drawing Sheets

OTHER PUBLICATIONS

Siegler, M.A., et al., "Automatic Segmentation, Classification and Clustering of Broadcast News Audio," *ECE Department—Speech Group,* Carnegie Mellon University, Pittsburgh, PA, Feb. 1997.

Woodland, P.C., et al., "Effects of Out of Vocabulary Words in Spoken Document Retrieval," *In Proceedings,* SIG/R 2000, Jul. 2000.

Brent, Michael R., "An Efficient, Probabilistically Sound Algorithm for Segmentation and Word Discovery," *John Hopkins University,* Department of Cognitive Science, pp. 1-65, (1999).

Siegler, M.A., et al., "Experiments in Spoken Document Retrieval at CMU," *School of Computer Science, Carnegie Mellon University,* Pittsburgh, PA, 1998.

Schäuble, P., and Wechsler, M., "First Experiences With a System for Content Based Retrieval of information from Speech Recordings," *Swiss Federal Institute of Technology,* CH-8092 Zürich, 1995.

Vogt, C.C. and Cottrell, G.W., "Fusion Via a Linear Combination of Scores," *Computer Science and Engineering, University of California San Diego,* La Jolla, CA, (1999).

Ng, Kenney, "Information Fusion for Spoken Document Retrieval," *Spoken Language Systems Group,* MIT Laboratory for Computer Science, Cambridge, MA, (2000).

Cormen, T.H., et al., "Dynamic Programming," *Introduction to Algorithms,* The MIT Press (McGraw-Hill Book Company), pp. 314-319 (1990).

Pagel, V., et al., "Letter to Sound Rules for Accented Lexicon Compression," *Faculté Polytechnique de Mons,* Dolez 31, 7000 Mons, Belgium, *Carnegie Mellon University,* 5000 Forbes Av. Pittsburgh, PA, USA, *Centre for Speech Technology Research,* University of Edinburgh, UK, (1998).

Whittaker, E.W.D., and Woodland, P.C., "Particle-Based Language Modelling," *Cambridge University Engineering Department,* Trumpington Street, Cambridge CB2 1PZ, UK, (2000).

Srinivasan, S. and Petkovic, D., "Phonetic Confusion Matrix Based Spoken Document Retrieval," *IBM Almaden Research Center,* 650 Harry Road, San Jose, CA USA, pp. 81-87, (2000).

Clements, M., et al., "Phonetic Searching vs. LVCSR: How to Find What You Really Want in Audio Archives," *Fast-Talk Communications, Inc.,* Atlanta, Georgia, (2001).

Zobel, J. and Dart, P., "Phonetic String Matching: Lessons from Information Retrieval," *Department of Computer Science,* RMIT Melbourne, Australia, *Department of Computer Science,* The University of Melbourne, Melbourne, Australia, pp. 166-172, (1996).

Kemp, T. and Waibel, A., "Reducing the OOV Rate in Broadcast News Speech Recognition," *Interactive Systems Laboratories, ILKD,* University of Karlsruhe, Karlstruhe, Germany, (1998).

Jones, G.J.F. et al., "Retrieving Spoken Documents by Combining Multiple Index Sources," *Computer Laboratory, University of Cambridge,* Cambridge, England, *Engineering Department, University of Cambridge,* Cambridge, England, (1996).

Van Thong, J.M., et al., "SpeechBot: a Speech Recognition Based Audio Indexing System for the Web," *Cambridge Research Laboratory,* Compaq Computer Corporation, Cambridge, MA, (2000).

Jelinek, Frederick, "Basic Language Modeling." In *Statistical Methods for Speech Recognition,* (The MIT Press), pp. 57-78 (1998).

James, David A., "A System for Unrestricted Topic Retrieval from Radio News Broadcasts," *Union Bank of Switzerland,* Zurich, Switzerland, pp. 279-282, (1996).

Ng, Kenney, "Towards Robust Methods for Spoken Document Retrieval," *Spoken Language Systems Group,* MIT Laboratory for Computer Science, Cambridge, MA, (1998).

Witbrock, M.J., and Hauptmann, A.G., "Using Words and Phonetic Strings for Efficient Information Retrieval from Imperfectly Transcribed Spoken Documents," *School of Computer Science,* Carnegie Mellon University, (1997).

\* cited by examiner

Search results for "taliban" - Microsoft Internet Explorer

File  Edit  View  Favorites  Help

Back  Forward  Stop  Refresh  Home | Search  Favorite  History  Mail  Print

Address [                                                                                    ]

STORE | PRODUCTS | SERVICES | SUPPORT | CONTACT US | SEARCH

🏠 New Search    302

| Simple Search | Power Search | Help | > FAQ | > Feedback |

Search for: [taliban                                      ]  [Search]—304

Topics: [All Topics ▼]   Dates: [All Dates ▼]

*Tip: To improve the relevance of your results, enter more that one word in the "Search for" box*

306

Search Result: 200 matches for your query    308    Sort results by: [Relevance ▼]

Audio 310
File                 Relevant Documents
                     (Transcripts based on speech recognition are not exact)

| ▶ PLAY 310a extract | ...by the opposition to the taliban and loss of territory by the taliban means they're weakening on... <br>Show me more | 308a |
| ▶ PLAY 310b extract | ...just give us briefly a little history here is the pakistan intelligence connection with the taliban in terms of the taliban survival or ability to... Show me more | 308b |
| ▶ PLAY 310c extract | ...that requires that among other things we 1st remove the threat from air defenses and from taliban aircraft we also seek to raise... Show me more | 308c |
| ▶ PLAY 310d extract | ...the city of kandahar which is in the southern part of afganistan this is basically the place of origin of the taliban they've been... Show me more | 308d |

FIG. 3B

METHOD TO EXPAND INPUTS FOR WORD
OR DOCUMENT SEARCHING

RELATED APPLICATION

This application is related to U.S. application Ser. No. 10/017,797, filed Dec. 12, 2001. The entire teachings of the above application are is incorporated herein by reference.

BACKGROUND OF THE INVENTION

Typically, when conducting a search to automatically retrieve spoken documents from a large repository of audio files, a user enters either a text or spoken query. The most common way to retrieve the spoken documents is to use speech recognition software to transcribe all the audio files in the repository. Once the audio files have been converted to text, standard algorithms for indexing the corresponding textual documents are applied. In response to a subsequent search query, the indexed documents are searched and the most relevant documents are returned to the user.

Over the years, multiple techniques have been developed for combating recognition error and "out of vocabulary" (OOV) problems associated with indexing spoken documents from transcribed audio files. One technique for combating recognition errors is to index multiple hypotheses, or N-best lists, to recover deleted or substituted query terms.

To combat OOV word problems, phoneme recognition can be used rather than word recognition. A phoneme is the smallest phonetic unit in a language that is capable of conveying a distinction in meaning, as the m of mat and the b of bat in English. The transcribed audio files and search query term(s) are converted into phonemes rather than words. This may be accomplished by first generating a word transcription using speech recognition and then for each word, looking up the phoneme pronunciation in a dictionary or generating the phoneme pronunciation using a rule based algorithm. Alternatively, phoneme recognition can be used to directly convert audio to phoneme transcriptions. Several hypotheses of phonemes may be generated for each audio segment.

Phoneme indexing techniques may be improved by: indexing sequences of phonemes; using phonetic confusion matrices to expand the search query and the document representation; combining word and phoneme models.

Word searching and retrieval are also used in other settings, for example spell checking. Typically, a user types characters on a keyboard to create an electronic document. The document may contain a number of spelling errors. To eliminate these spelling errors, a spell correction program compares the words in the document with words in a dictionary. If the word in the document does not correspond to one of the words in the dictionary, an indication is provided to the user that the word may be misspelled. Further, spell correction programs may provide a list of suggested words to replace the misspelled word.

Normal spell correction algorithms are based on how a user confuses one character with another while typing. The algorithm checks character closeness based on a typical "QWERTY" keyboard. The algorithm tries to generate an in-dictionary word by replacing, adding, deleting or transposing one character with another. This is typically done using an edit distance to measure the distance from each of these new hypothesis and the entered word or using lists of common mistakes.

SUMMARY OF THE INVENTION

As alluded to above, transcribing the audio files using speech recognition software suffers from two major disadvantages. First, the text produced by the speech recognizer is limited to a fixed vocabulary (look-up dictionary). Second, speech recognition error rates are considerably high and impact the accuracy of the document retrieval for anything but very clean audio.

Spelling correction algorithms do not consider replacing one word by more than one word. Further, typical spell checking techniques do not use a language model to suggest multi-word replacements.

The present invention overcomes the problems of prior art by providing an electronic document/word searching system which when given a search input, expands the input as a function of acoustic similarity and/or frequency of word sequence occurrence resulting in alternative input words or phrases. The alternative input words or phrases are returned for further processing. In one embodiment, the electronic documents are transcriptions of spoken input, and the input is a search query. In another embodiment, the word searching is for purposes of spell checking or as a part of a spell checker program. In that case, the input is user entered (keyed) text and the resulting alternative input words are used as alternative spellings for the user entered text.

In a preferred embodiment, the given search input may be expanded by translating the words in the input to one or more phoneme strings. This translation includes converting the words to phonemes by looking up the words in a pronunciation dictionary or by using letter to phoneme rules to automatically generate a pronunciation. Further, phoneme strings are generated from the initial translation using a confusion matrix and scored. The confusion matrix stores indications of the likelihood of confusion between pairs of phonemes, the likelihood of deleting each phoneme in a pronunciation of a word, and the likelihood of inserting each phoneme in a pronunciation of a word.

Word boundaries are then determined in each of the phoneme strings to produce valid phoneme subsequences. Example-based or syllable-based word boundaries can be used to produce valid phoneme subsequences.

Example-based word boundaries break up (segment) each of the phoneme strings into a list of segmented phoneme strings. Valid segmented phoneme strings may be found by looking up a dictionary.

Syllable-based word boundaries break up (segment) each of the phoneme strings into a list of segmented phoneme strings. Valid segmented phoneme strings may be found as those which contain at least a vowel.

At least one confusable word phrase having a pronunciation which is acoustically similar to the phoneme subsequence may be generated for each valid phoneme subsequence. To produce a confusable word phrase, each valid phoneme subsequence is compared to word pronunciations from a dictionary. Each word is assigned a pronunciation score by scoring the word pronunciation of each word in the dictionary against the valid phoneme subsequence using a distance metric. The distance metric of the preferred embodiment is defined as follows:

$$S(p_0, d_0) = 0$$

$$S(p_i, d_j) = \min \begin{Bmatrix} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{Bmatrix}$$

$$S(P,D) = S(p_n, d_n) + LP(p_n, d_n)$$

where:

P is a hypothesized pronunciation in the phoneme subsequence;

D is the pronunciation from the dictionary;

S(P, D) is the distance between P and D;

$(p_i, d_j)$ is the score of phoneme string matching a given phoneme $p_i$ of P, and phoneme $d_j$ of D;

$C_{subs}(p_i, d_j)$ is the cost of substituting phoneme $p_i$ of P with phoneme $d_j$ of D;

$C_{del}(p_i)$ is the cost of deleting phoneme $p_i$ of P;

$C_{ins}(d_j)$ is the cost of inserting phoneme $d_j$ of D;

$LP(p_n, d_n)$ is the length penalty of decoded phoneme string $p_n$ matching pronunciation $d_n$.

To produce a confusable word phrase for each phoneme string, each possible combination of confusable words corresponding to each set of valid phoneme subsequences for the phoneme string is considered. A score may be given to each confusable word phrase according to the pronunciation score of each word and the language model score of the complete phrase.

In response to the initial given input, a search of an index is performed using the alternative input word or phrase to search for a match in the index. The search of includes using a proximate match for each alternative input phrase. The indexer's score may be augmented with a score associated with each alternative input word or phrase. The search results include the probability of the alternative input word or phrase and/or the probability of a proximate match. The electronic documents are re-ranked according to the augmented score.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3B shows a screen view of an audio retrieval system's result screen.

DETAILED DESCRIPTION OF THE INVENTION

A description of preferred embodiments of the invention follows.

Figure 1:
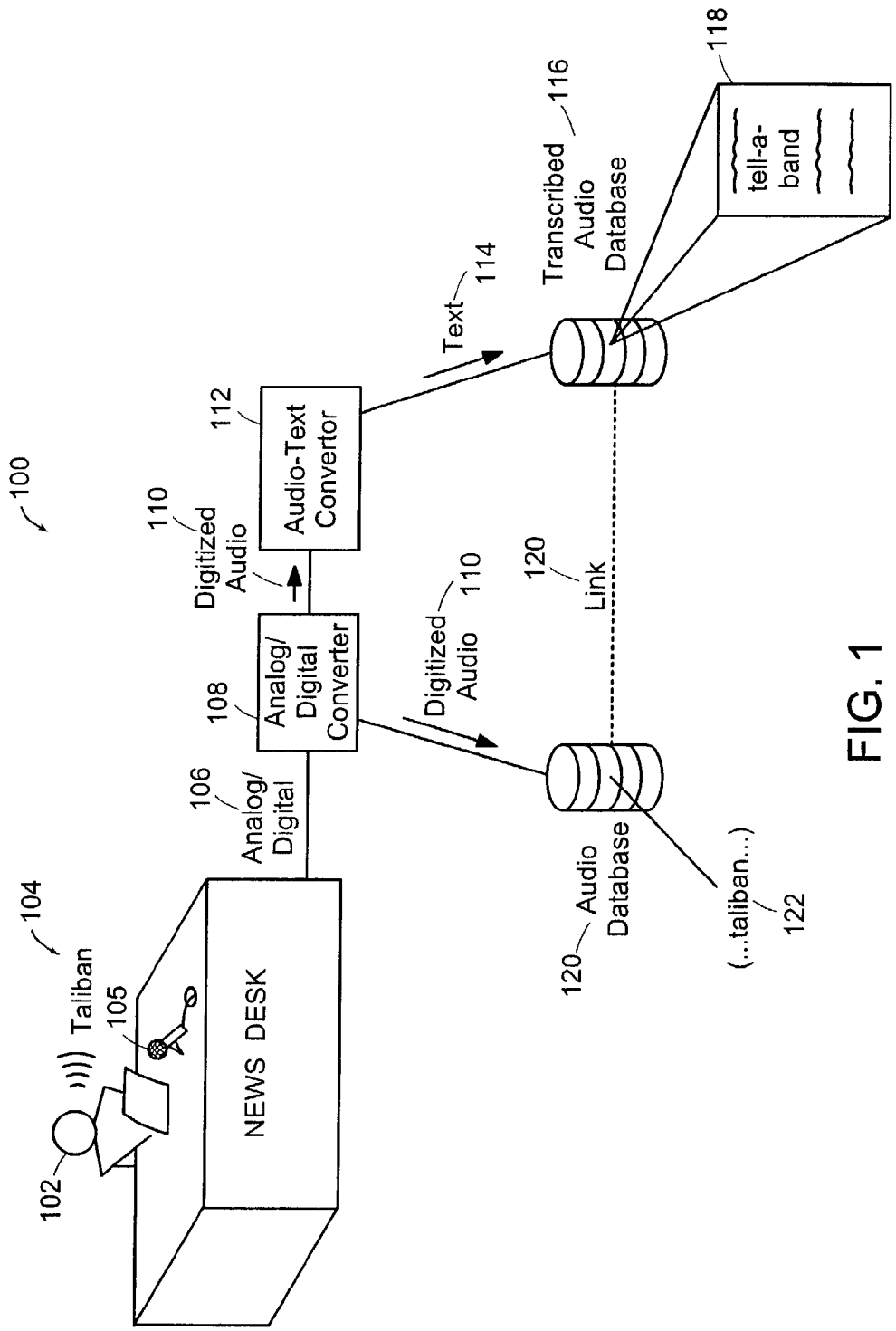
FIG. 1 is a schematic view of audio-to-text storage system.

FIG. 1 shows a standard audio-to-text storage system 100 for transcribing spoken audio to be indexed using speech recognition. A speaker 102, speaks a word or series of words 104 into a microphone 105 or other capturing and recording device. The spoken word or series of words 104 is recorded to a storage medium 106 in either an analog or digital format. If the storage medium 106 is in analog form, the stored contents are converted to digital format by analog-to-digital (A/D) converter 108. The resulting digitized audio file 110 is then stored in an audio file database 120 for future use. The digitized audio file 110 is also converted to a textual document 114 by an audio-to-text (A/T) converter 112. The textual document 114 is stored and indexed in a transcribed audio database (TAD) 116 and an associated link 120 between the digitized audio file 110 and corresponding/respective textual file 114 is established.

Various errors occur when converting digitized audio files 110 to textual documents 114 on of which is the limited vocabulary of the A/T converter 112. An example is shown in FIG. 1, where word "Taliban" 104 is originally spoken into the microphone 105 by the speaker 102. The A/T converter 112 falsely recognizes the word "Taliban" 104 to be "Tell-a-band" 118 and stores and indexes the incorrect word in the corresponding transcribed text document 114. Meanwhile the link associated digital audio file 110 in audio file data base 120 indicates the subject word to be "Taliban" 122.

Figure 2:
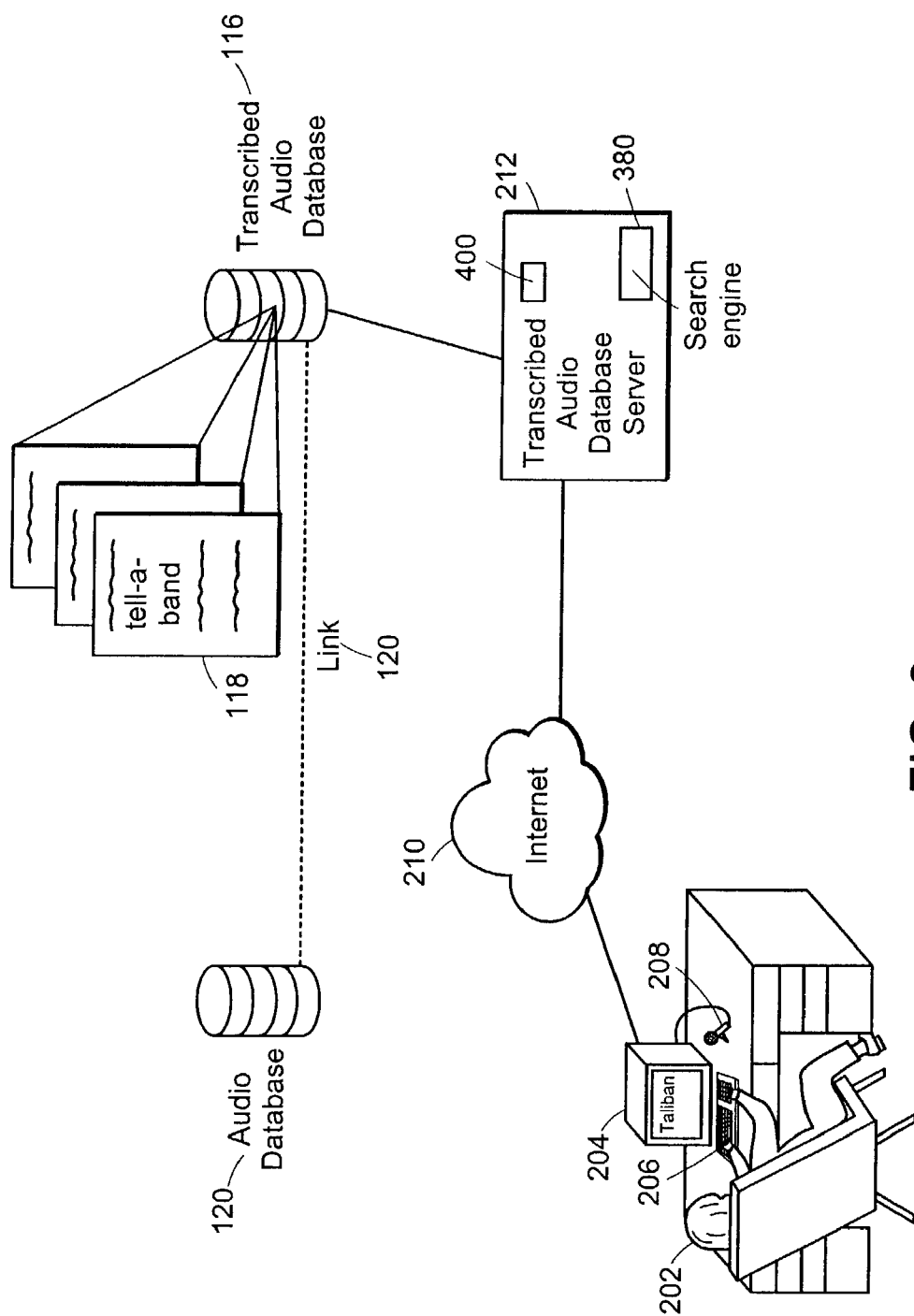
FIG. 2 is a schematic illustration of a transcribed audio retrieval system in which the present invention is/may be employed.
Figure 3A:
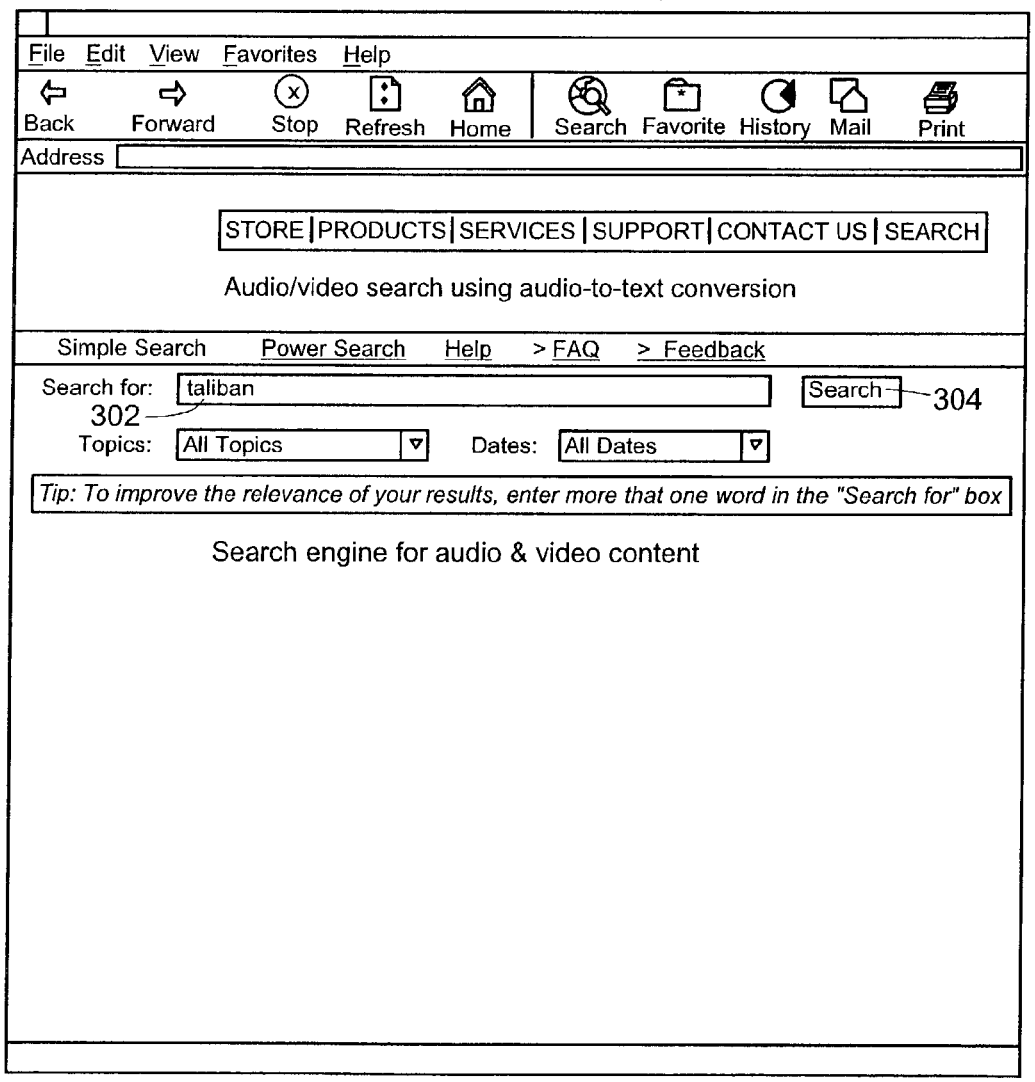
FIG. 3A shows a screen view of an audio retrieval system's search screen.

FIGS. 2–3B show a user 202 (and user interface for) accessing the transcribed audio database 116 (i.e. text documents 114 therein) and associated audio file database 120 (i.e. audio files 110 therein). In particular, user 202 retrieves text files 114 and corresponding audio files 110 from respective databases 116, 120 based on a user specified query word or series of words. The user 202 connects to the transcribed audio database server (TADS) 212 through a computer 204 or like device. The connection can be made over the Internet 210 using a web browser or other connection means. Through the user interface 300, such as illustrated in FIGS. 3A and 3B, the user 202 enters a query into a underlying search engine 380 (FIG. 2) which is executed by the TADS 212. The query can be entered either spoken via a microphone 208 or manually via keyboard 206 in the search box 302 (FIG. 3A). Upon user command 304 to commence the search, search engine 380 (FIG. 2) employs standard indexing techniques to return relevant document links 308 (FIG. 3B) and their associated audio file links 310 (FIG. 3B).

Continuing with the example of FIG. 1 in FIGS. 2 and 3A, a user 202 enters the query term "Taliban" into search box 302 of search engine interface 300. The TADS 212 search engine 380 searches the TAD 116 for documents (text files 114) relating to the queried term "Taliban." The TADS 212 mimics the A/T conversion 112 (FIG. 1) process to produce a list of relevant documents/files containing the term "Taliban" and returns the textual document links (308a–308d) and their associated audio file links (310a–310d) as search results 306 (FIG. 3B). Search engine 380 displays these search results 306 to the user 202 through interface 300 as illustrated in FIG. 3B. The user 202 has the option of reading the textual document via the textual document links (308a–308d) or hearing the audio file via audio file links (310a–310b).

Figure 4:
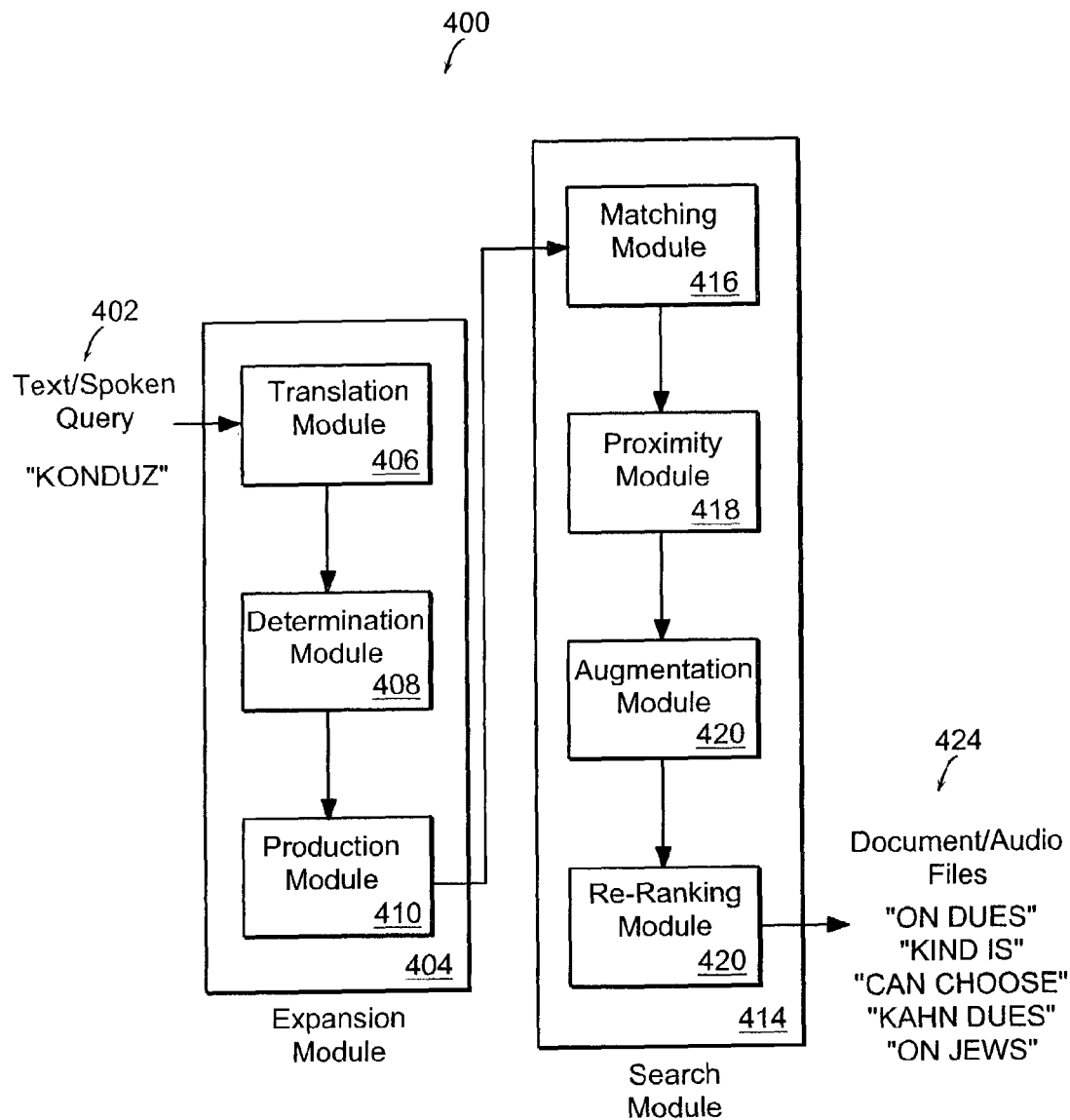
FIG. 4 is a block diagram of the present invention with a expansion module-based recognizer system.

The present invention increases the accuracy with which search engine 300 retrieves audio and/or text files 110, 114 in the foregoing environment. FIGS. 2 and 4 generally illustrates an expansion module based recognizer (EMBR) 400. The EMBR 400 consists of two components, an expansion module 404 and search module 414. The EMBR 400 performs query expansion using expansion module 404 to mimic the mistakes of the A/T 112 (FIGS. 1 and 2). The expansion module 404 is formed of a translation module 406, a determination module 408 and a production module 410. The search module 414 includes a matching module 416, a proximity module 418, an augmentation module 420 and a re-ranking module 422. Each module is described in further detail below.

Generally, a textual/spoken query 402, such as the word "KONDUZ" is received as input at the expansion module 404. In response, the expansion module 404, expands the word "KONDUZ" and produces a list of alternative query/word phrases. The search module 414 uses the produced list of alternative query/word phrases to search an index and output the related document/audio files 424 containing the original query word/phrase and/or containing word/phrases that have pronunciations close to the original query word or phrase. As illustrated in FIG. 4, an example output of similar words to "KONDUZ" are "ON DUES"; "KIND IS"; "CAN CHOOSE"; "KAHN DUES"; and "ON JEWS."

The EMBR 400 has the advantage of a constant search time and moderate storage requirements. The EMBR 400 can find queries relating to OOV words/phrases. However, a side effect is that mis-recognition of in-dictionary query word/phrases may also be recovered. A discussion of each module 406, 408, 410, 416, 418, 420, and 422 follows.

Figure 5:
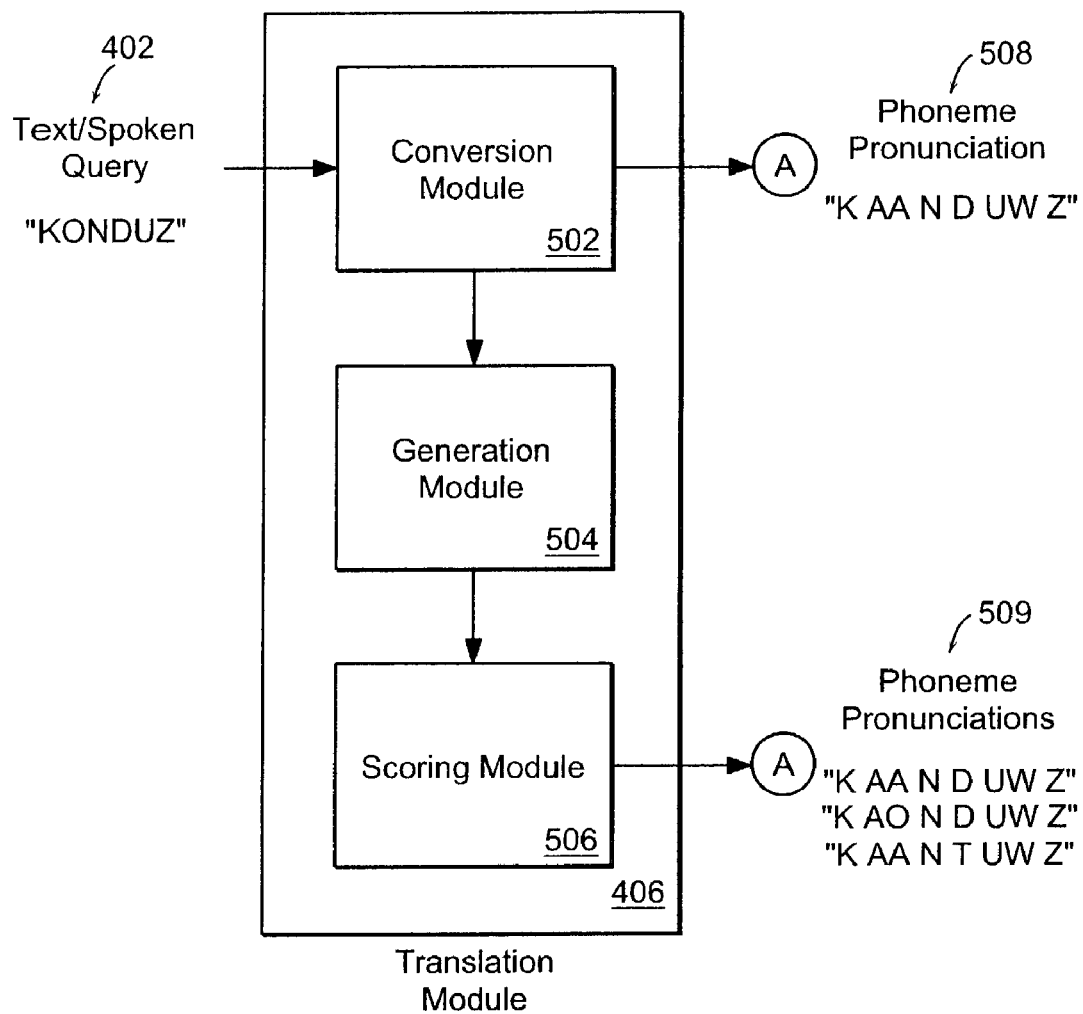
FIG. 5 is a block diagram with a more detailed description of the translation module of FIG. 4.

FIG. 5 shows the components of the translation module 406. If the input query word/phrase 402 cannot be found in a pronunciation dictionary then the conversion module 502 expands the query word/phrase 402 into a phoneme pronunciation 508.

In another embodiment, further phoneme pronunciations 509 of the input query word/phrase 402 may be generated using a generation module 504. One method of generating further phoneme pronunciations 509 is to use a dictionary to look up alternative pronunciations of the input query word/phrase 402 and/or to change one or more phonemes in the initial pronunciation 508. Additionally, one or more phonemes may be inserted or deleted from the phoneme pronunciation 508.

Since the number of possible alternate phoneme pronunciations 509 is large for any given sequence of phonemes, each alternative phoneme pronunciation 509 is given a score by scoring module 506. Preferably translation module 406 forwards only the top N scoring alternatives to the determination module 408. The scoring module 506 can be based on an intrinsic acoustic confusability model and language models for phoneme sequences. The acoustic confusability model is calculated by recognizing transcribed audio and counting how many times a particular phoneme is confused with each other phoneme, and how many times it is inserted and/or deleted in a word pronunciation. These counts can be converted to probabilities and stored in matrix form. The matrix is known as a phoneme "confusion matrix." A language model for phoneme sequences can be generated by converting a large body of text to phonemes. The language model is built using phonemes as is common to one skilled in the art.

For example, the translation module 406 converts the input query word/phrase "KONDUZ" 402 to the initial phoneme pronunciation "K AA N D UW Z" 508. The generation module 504 produces "K AO N D UW Z"; and "K AA N T UW Z" as alternative phoneme pronunciations 509 for the input query word/phrase "KONDUZ" 402. Scoring module 506 scores and orders the phoneme pronunciations 509 according to probabilities or likelihood of confusion between pairs of phonemes across the candidate pronunciations 509.

Figure 6A:
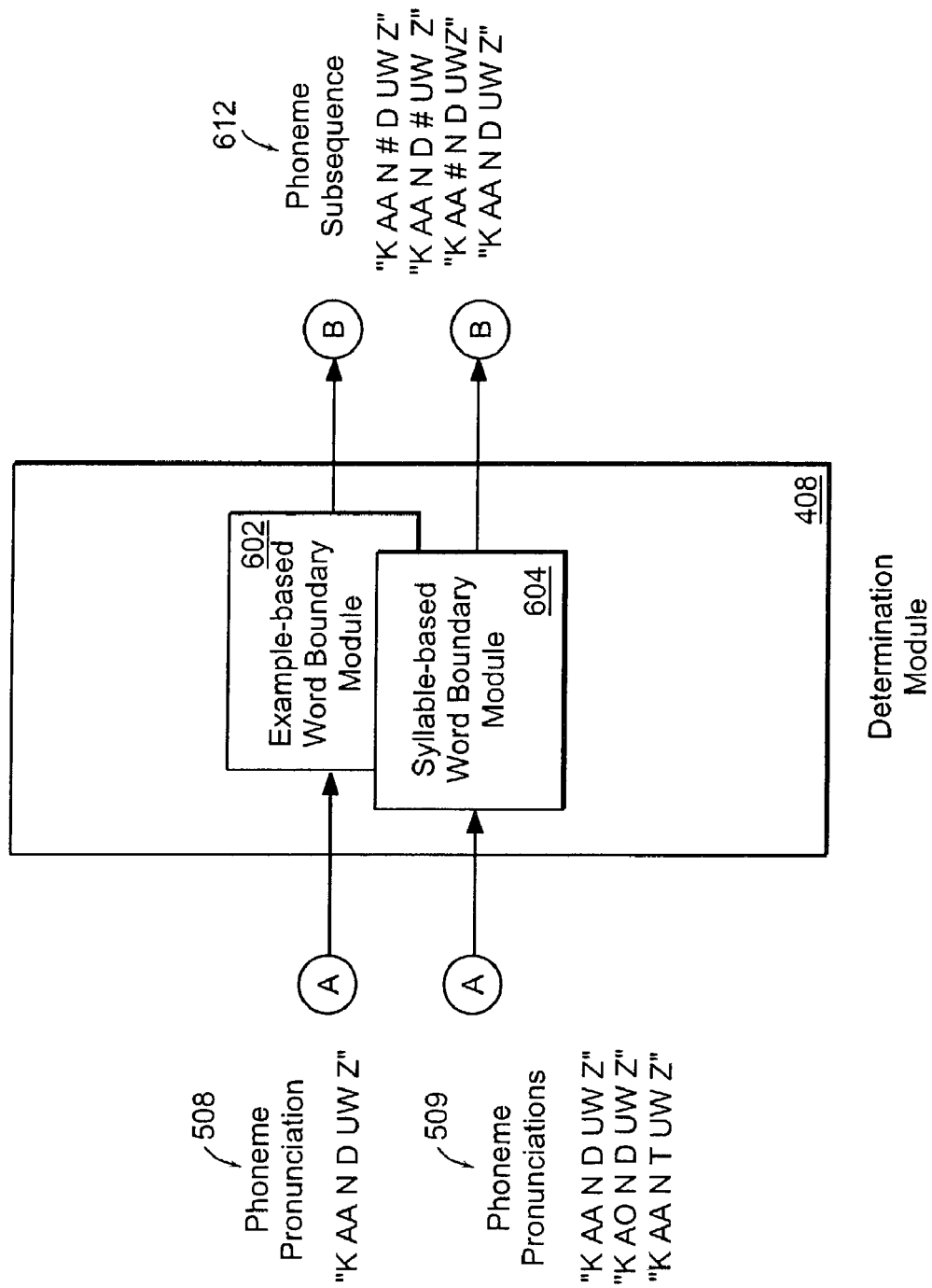
FIG. 6A is a block diagram with a more detailed description of the determination module of FIG. 4.
Figure 6B:
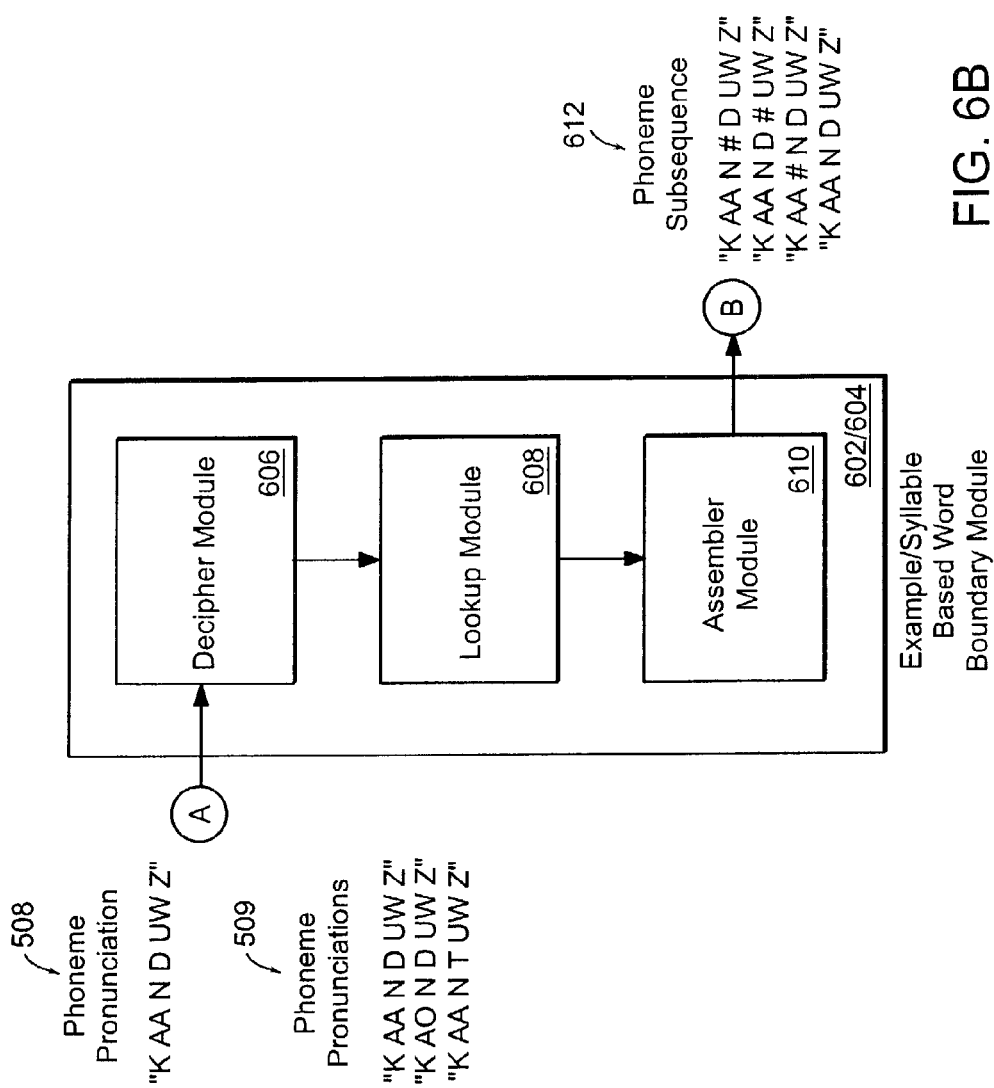
FIG. 6B is a block diagram with a more detailed description of the Example/Syllable based word module of FIG. 6A.

Continuing with FIG. 4, translation module 406 outputs the phoneme pronunciation 508 or the scored phoneme pronunciation 509 to determination module 408. FIGS. 6A and 6B show the determination module 408 and its associated components. Generally, word boundaries are determined from the phoneme pronunciations 508, 509 generated by the translation module 406. Determination module 408 uses either an example-based word module 602 or a syllable-based word module 604 to determine the word boundaries. The result is a set of phoneme subsequences 612 for each phoneme pronunciation 508, 509. For example, the phoneme string "K AA N D UW Z" may be segmented as: "K AA N # D UW Z"; "K AA N D # UW Z"; "K AA # N D UW Z"; and "K AA N D UW Z" where "#" denotes a proposed word boundary. Note that the entire phone pronunciation "K AA N D UW Z" is part of the set.

As illustrated in FIG. 6b, example-based word boundary module 602 uses a dictionary (or predetermined vocabulary) to determine the word boundary. A decipher module 606 considers each possible place to break the phoneme pronunciation 508, 509. Each broken segment of the phoneme pronunciation 508, 509 is called a "phoneme subsequence." A lookup module 608 looks up the phoneme subsequence in the dictionary. If the phoneme subsequence is found in the dictionary, the rest of the phoneme subsequences in the pronunciation 508, 509 are processed until the end of the sequence is reached. At each stage, since the same sequence of phoneme subsequences can be the pronunciation for multiple words, the process must be repeated for each of these words. The assembler module 610 provides an augmented list of segmented phoneme pronunciations. Each segment corresponds to a word whose pronunciation has been found in the dictionary. This approach gives good results if the dictionary has a large number of words (greater than 50,000 words).

Syllable-based word boundary module 604 segments the phoneme pronunciation 508, 509 at syllable boundaries. A syllable is a unit of spoken language consisting of a single uninterrupted sound formed by a vowel, diphthong, or syllabic consonant alone, or by any of these sounds preceded, followed, or surrounded by one or more consonants. For instance, can has one syllable, while canvas has two. By definition, syllable boundaries are potential word boundaries so they can be used for segmentation. A simple way to perform syllable segmentation is to search for all possible phoneme subsequences that contain at least one vowel. The algorithm is similar to the example-based word boundary technique described above except instead of looking up the phoneme subsequence in a dictionary, the boundary is found if the phoneme subsequence contains a vowel. Other techniques based on probabilistic models of word or syllable boundaries can be used to sensibly break a phoneme pronunciation 508, 509.

Figure 7:
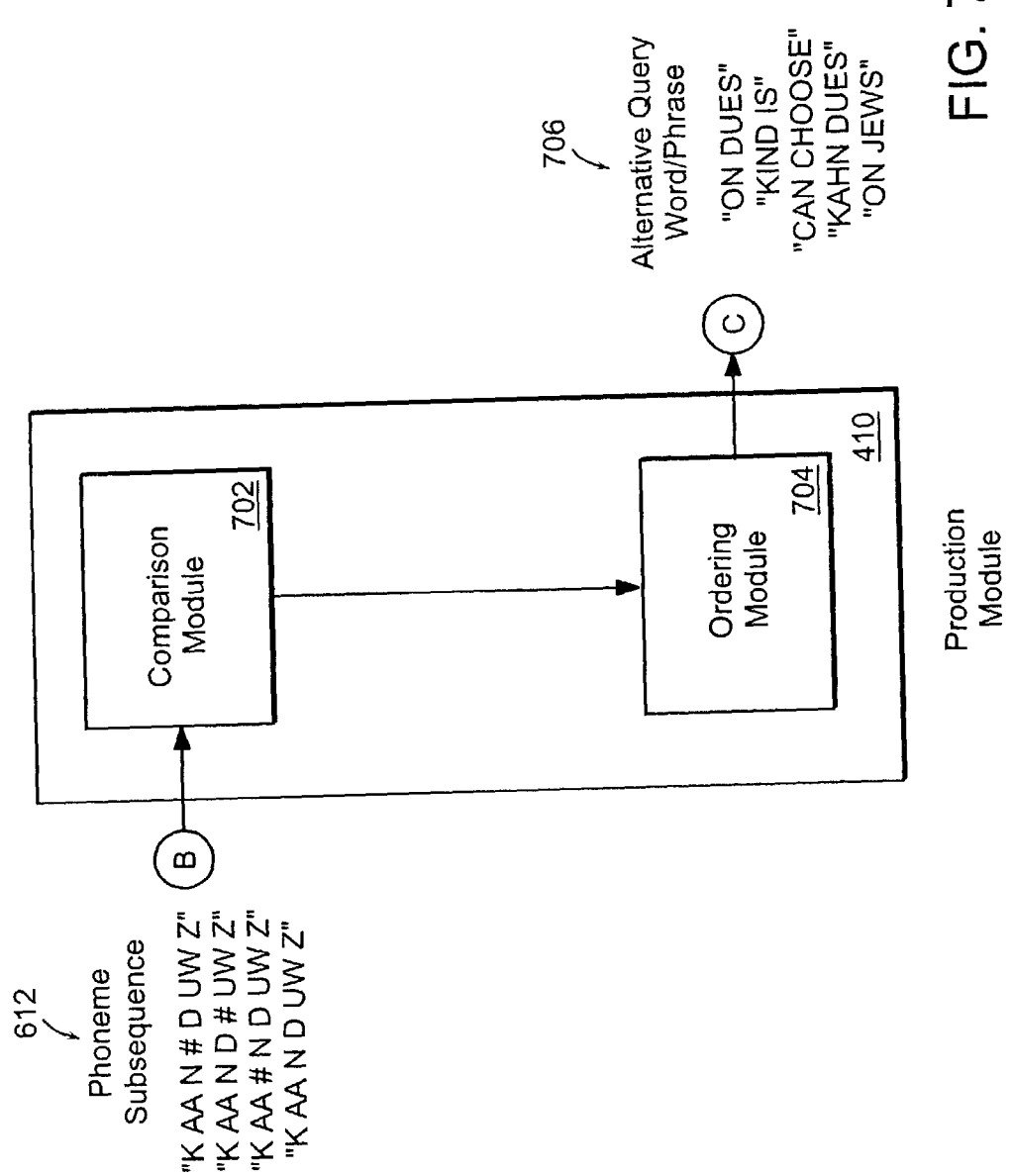
FIG. 7 is a block diagram with a more detailed description of the production module of FIG. 4.

Referring back to FIG. 4, the phoneme subsequences 612 generated by determination module 408 are input to production module 410. As shown in FIG. 7, the production module 410 expands each phoneme subsequence 612 into words that have similar pronunciation. A comparison module 702 compares each phoneme subsequence 612 to the word pronunciations from the dictionary used in the recognition step 112 (FIG. 1) of translating the spoken audio file. The result is an ordered list of words, the most likely pronounced word being at the top of the list.

To obtain the ordered list, an ordering module 704 scores the pronunciation for each word in the dictionary against a given phoneme subsequence 612 using the following distance metric:

$$S(p_0, d_0) = 0$$

$$S(p_i, d_j) = \min \begin{Bmatrix} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{Bmatrix}$$

$$S(P,D) = S(p_n, d_n) + LP(p_n, d_n)$$

where:

P is a hypothesized pronunciation in the phoneme subsequence 612;

D is the pronunciation from the dictionary;

S(P, D) is the distance between P and D;

$S(p_i, d_j)$ is the score of phoneme string matching a given phoneme $p_i$ of P, and phoneme $d_j$ of D;

$C_{subs}(p_i, d_j)$ is the cost of substituting phoneme $p_i$ of P with phoneme $d_j$ of D;

$C_{del}(p_i)$ is the cost of deleting phoneme $p_i$ of P;

$C_{ins}(d_j)$ is the cost of inserting phoneme $d_j$ of D;

$LP(p_n, d_n)$ is the length penalty of decoded phoneme string $p_n$ matching pronunciation $d_n$.

Dynamic programming algorithms can be used to efficiently find the N highest scoring pronunciations from the dictionary given this distance metric and a phoneme subsequence 612. The insertion, deletion, and substitution costs can be obtained from a phoneme confusion matrix.

For example, a possible set of word alternatives for the phoneme subsequence "K AA N # D UW Z" may be "CAAN DUES," "CAEN DUES," "CON DUES," "KAHN DUES," "KHAN DUES," "KOHN DUES," and "KON DUES."

A large list of word alternatives may be produced for all phoneme subsequences 612. To improve efficiency, the list can be pruned to retain only the top M word alternatives. Pruning can be achieved by using language model probabilities to score each set of word alternatives.

For example the phoneme subsequences "K AA N # D UW Z"; "K AA N D # UW Z"; "K AA # N D UW Z"; and "K AA N D UW Z" 612 may produce a list of alternative query word/phrase "ON DUES"; "KIND IS"; "CAN CHOOSE"; "KAHN DUES"; and "ON JEWS" 706.

Although the algorithm is described in a series of steps, those skilled in the art could perform the algorithm in one step since the steps describe a search over the space of all possible confusions of all possible word segmentations given an initial pronunciation of the query word.

Figure 8:
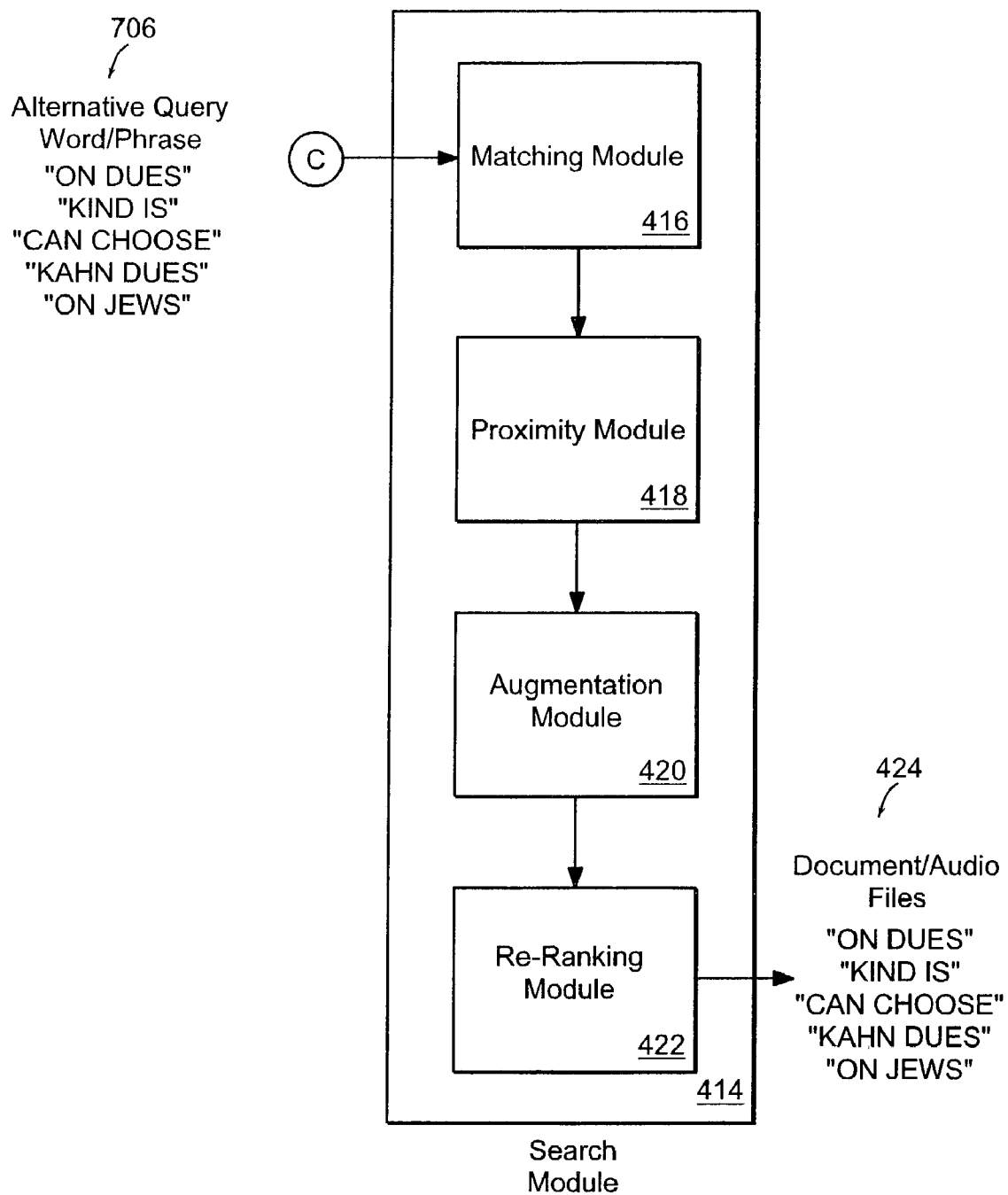
FIG. 8 is a block diagram with a detailed description of the search module of FIG. 4.

As shown in FIGS. 4 and 8, the search module 414 uses the alternative query/word phrases 706 generated by production module 410 search the TAD 116 (FIGS. 1 and 2) for documents/text file 114 containing any of the alternative query/word phrase 706. A matching module 416 searches for an exact match of each alternative query/word phrase 706. To avoid false positives, it is important that proximity information be included in the query. A proximity module 418 searches for a proximate match of each alternative query/word phrase 706. Where "proximate" means that the words in the query phrase are within a minimum number of words of each other in the indexed document. In the above example, the first alternative would involve a search for the exact phrase "ON DUES" or "ON" near "DUES" where "near" implies within a few words. An example of a matching module 416 and proximity module 418 is the Alta Vista indexer (U.S. Pat. No. 5,745,899 incorporated herein by reference). The Alta Vista indexer can return all the hits for such queries in a matter of seconds, even for a very large index.

Many indexers 418, 418 return a score or rank with each document retrieved. An augmentation module 420 can use the score generated by the scoring module 506 to augment the score generated by the indexer 416, 418. A re-ranking module 422 can re-rank the documents according to the augmented score produced in augmentation module 420 and produce a list of document/audio files 424 for the user to choose from. The produced list is displayed as search results 306 through user interface 300.

Figure 9:
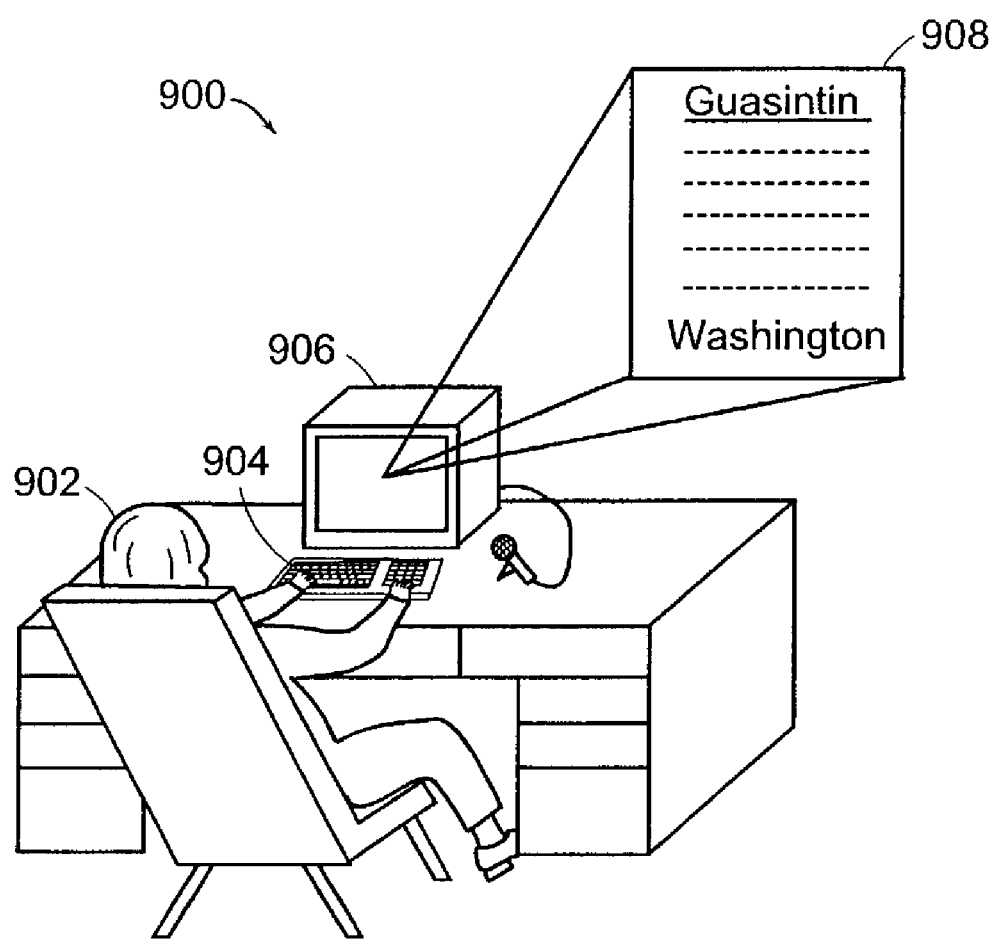
FIG. 9 is a schematic illustration of another embodiment in which the present invention is employed as a spelling correction system.
Figure 10:
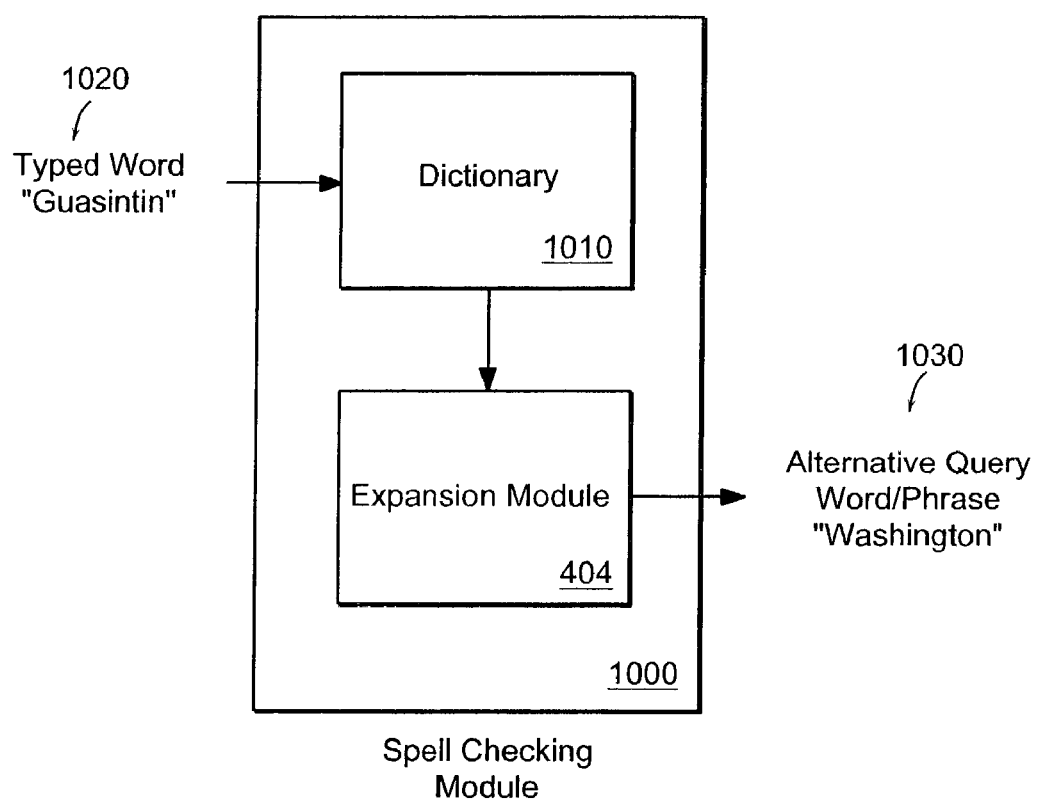
FIG. 10 is a block diagram of the another embodiment of the invention with a expansion module-based spelling correction module.

In another embodiment, as shown in FIG. 9, there is provided a spelling correction system 900. A user 902 types words via a keyboard 904 into a computer 906 or like device to create an electronic document 908. As shown in FIG. 10, a typed word 1020 in electronic document 908 is spell checked using spell checking module 1000 which compares the typed word 1020 to the words in dictionary 1010. If the typed word 1020 is not found in the dictionary 1010, the expansion module 404 (FIGS. 4 and 10) hypothesizes alternative words 1030 that sound "acoustically" similar to the typed word 1020 and a list of alternative words 1030 are returned to the user or used for further processing.

For example, a user may remember (from listening to a radio or television broadcast) how a word "sounded." The user types a first approximation of the word in the electronic document 908 and the spell checking module 1000 returns the closest acoustical match (e.g., a list of alternative words 1030) to the typed word 1020. In the illustrated example, a user remembers hearing the word "Washington," but does not remember the correct spelling. The user types the word "Guasinton" and the system returns "Washington".

Further, the expansion module 404 (FIGS. 4 and 10) can hypothesis a single word with multiple words. For example, a user types the word "Washington" (mistakenly adding a space between the "h" and the "i"). The expansion module 404 (FIG. 4 and 10) returns to the user the word "Washington" as one of its hypotheses.

While this invention has been particularly shown and described with references to preferred embodiments thereof, it will be understood by those skilled in the art that various changes in form and details may be made therein without departing from the scope of the invention encompassed by the appended claims.

For example, in one embodiment, the expansion module 404 and search module 414 are implemented on a server computer system 212. The server computer can be a separate computer accessed by a user 202 over a network (hard wired or wireless) or other remote communications assembly. In general, any or all of the components of the present invention (e.g., 404, 414) can be implemented in a distributed computing approach. For example, the expansion module 404, and the search module 414 can be implemented on separate servers, which are part of the same or separate computer systems. The expansion module 404 can be located on a separate computer and used as a module in a spelling correction system. Various other configurations in place of or in addition to client-server architectures and computer networks are suitable and may include (but are not limited to) parallel processing, multi-processing, push or pull technology/network communications, and the like.

What is claimed is:

1. A method for electronic document or word searching, comprising the steps of:
   (a) given an input, expanding the input as a function of at least one of (i) acoustic similarity and/or (ii) frequency of word sequence occurrence, said expanding resulting in alternative input words or phrases, wherein the step of expanding includes:
       translating words in the given input to one or more phoneme strings;
       determining word boundaries in each of the phoneme strings to produce respective phoneme subsequences; and
       for each produced phoneme subsequence, generating at least one confusable word phrase having a pronunciation which is acoustically similar to the phoneme subsequence, said confusable word phrase forming an alternative input word or phrase, wherein the step of generating at least one confusable word phrase includes:
   comparing each phoneme subsequence to word pronunciations from a dictionary, said comparing resulting in a list of words from the dictionary; and
   ordering the list of words from the dictionary, the most likely word being at the top of the list, said ordering of the list including scoring the word pronunciation of each word in the dictionary against the phoneme subsequence using a distance metric based on the distance between a hypothesized pronunciation in the phoneme subsequence and the pronunciation from the dictionary; and
   (b) returning the alternative input words or phrases for further processing.

2. A method as claimed in claim 1, wherein the electronic documents are transcriptions of spoken input.

3. A method as claimed in claim 1, wherein the word searching is a spell checker.

4. A method as claimed in claim 1, wherein the input is a query.

5. A method as claimed in claim 1, wherein the step of translating words in the given input to one or more phoneme strings further includes: converting the words to phonemes by at least (i) looking up the words in a dictionary or (ii) using letter to phoneme rules to automatically generate a pronunciation.

6. A method as claimed in claim 5, wherein the step of translating words in the given input to one or more phoneme strings further includes:
   generating one or more phoneme strings of the converted word phonemes based on a confusion matrix; and
   scoring the one or more phoneme strings based on the confusion matrix.

7. A method as claimed in claim 6, wherein the confusion matrix stores indications of the likelihood of confusion between pairs of phonemes, the likelihood of deleting each phoneme in a pronunciation of a word, and the likelihood of inserting each phoneme in a pronunciation of a word.

8. A method as claimed in claim 1, wherein the step of determining word boundaries in each of the phoneme strings to produce respective phoneme subsequences uses an example-based word boundary.

9. A method as claimed in claim 8, wherein the example-based word boundary includes:
   breaking up each of the phoneme strings into a list of segmented phoneme strings;
   looking up each segmented phoneme string in a dictionary; and
   producing a list of segmented phoneme strings found in the dictionary.

10. A method as claimed in claim 10, wherein the step of determining word boundaries in each of the phoneme strings to produce respective phoneme subsequences uses a syllable-based word boundary.

11. A method as claimed in claim 10, wherein the syllable-based word boundary includes:
    breaking up each of the phoneme strings into a list of segmented phoneme strings; determining if each segmented phoneme string contains at least a vowel; and
    producing a list of segmented phoneme strings containing at least one vowel.

12. A method as claimed in claim 1, wherein the distance metric is defined as follows:

$$S(p_0, d_0) = 0$$

$$S(p_i, d_j) = \min \begin{Bmatrix} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{Bmatrix}$$

$$S(P,D) = S(p_n, d) + LP(p_n, d_n)$$

wherein:
   P is a hypothesized pronunciation in the phoneme subsequence;
   D is the pronunciation from the dictionary;
   S(P,D) is the distance between P and D;
   $S(p_i, d_j)$ is the score of phoneme string matching a given phoneme $p_i$ of P, and phoneme $d_j$ of D;
   $C_{subs}(p_i, d_j)$ is the cost of substituting phoneme $p_i$ of P with phoneme $d_j$ of D;
   $C_{del(pi)}$ is the cost of deleting phoneme $p_i$ of P;
   $C_{ins}(d_j)$ is the cost of inserting phoneme $d_j$ of D;
   $LP(p_n, d_n)$ is the length penalty of decoded phoneme string $p_n$ matching pronunciation $d_n$.

13. A method as claimed in claim 12, wherein scoring the word pronunciation of each word in the dictionary against the phoneme subsequence using a distance metric further includes, scoring the list of words using a language model.

14. A method as claimed in claim 1, wherein the step of further processing includes using the alternative input words or phrases resulting from said step of expanding, searching an index of electronic documents for the alternative input words or phrases in response to the given input.

15. A method as claimed in claim 14, wherein the step of searching the index includes:
    searching for an exact match of each alternative input word or phrase;
    searching for a "proximate" match of each alternative input phrase;
    augmenting an indexer's score with a score associated with each alternative input word or phrase, including a probability of the alternative input word or phrase and/or probability of a proximate match; and
    re-ranking the electronic documents according to the augmented score.

16. A method as claimed in claim 1, wherein the step of returning to a user the alternative input words or phrases further includes the user choosing correct alternative input words or phrases.

17. A computer system for electronic document or word searching, comprising:
an expansion module for expanding a input as a function of at least one of (i) acoustic similarity and/or (ii) frequency of word sequence occurrence, said expanding resulting in alternative input words or phrases and returning the alternative input words or phrases for further processing, wherein the expansion module comprises:
a translation module for translating words in the given input to one or more phoneme strings;
a determination module for determining word boundaries in each of the phoneme strings to produce respective phoneme subsequences; and
a production module for each produced phoneme subsequence, generating at least one confusable word phrase having a pronunciation which is acoustically similar to the phoneme subsequence, said confusable word phrase forming an alternative input word or phrase, wherein the production module comprises:
a comparison module for comparing each phoneme subsequence to word pronunciations from a dictionary, said comparing resulting in a list of words from the dictionary; and
an ordering module for ordering the list of words from the dictionary, the most likely word being at the top of the list, the ordering module scoring the word pronunciation of each word in the dictionary against the phoneme subsequence using a distance metric based on the distance between a hypothesized pronunciation in the phoneme subsequence and the pronunciation from the dictionary.

18. A computer system as claimed in claim 17, wherein the electronic documents are transcriptions of spoken input.

19. A computer system as claimed in claim 17, wherein word searching is a spell checking module.

20. A computer system as claimed in claim 17, wherein the input is a query.

21. A computer system as claimed in claim 17, wherein the translation module comprises: a conversion module for converting the words to phonemes by at least (i) looking up the words in a dictionary or (ii) using letter to phoneme rules to automatically generate a pronunciation.

22. A computer system as claimed in claim 21, wherein the translation module further comprises:
a generation module for generating one or more phoneme strings of the converted word phonemes based on a confusion matrix; and
a scoring module for scoring the one or more phoneme strings based on the confusion matrix.

23. A computer system as claimed in claim 22, wherein the confusion matrix stores indications of the likelihood of confusion between pairs of phonemes, the likelihood of deleting each phoneme in a pronunciation of a word, and the likelihood of inserting each phoneme in a pronunciation of a word.

24. A computer system as claimed in claim 17, wherein the determination module further comprises an example-based word boundary module for determining word boundaries in each of the phoneme strings to produce respective phoneme subsequences.

25. A computer system as claimed in claim 24, wherein the example-based word boundary module comprises:
a decipher module for breaking up each of the phoneme strings into a list of segmented phoneme strings;
a lookup module for looking up each segmented phoneme string in a dictionary; and
an assembler module for producing a list of segmented phoneme strings found in the dictionary.

26. A computer system as claimed in claim 17, wherein the determination module further comprises a syllable-based word boundary module for determining word boundaries in each of the phoneme strings to produce respective phoneme subsequences.

27. A computer system as claimed in claim 26, wherein the syllable-based word boundary module comprises:
a decipher module for breaking up each of the phoneme strings into a list of segmented phoneme strings;
a determination module for determining if each segmented phoneme string contains at least a vowel; and
a assembler module for producing a list of segmented phoneme strings containing at least one vowel.

28. A computer system as claimed in claim 17, wherein the the distance metric is defined as follows:

$S(p_0, d_0)$ $$S(p_i, d_j) = \min \begin{cases} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{cases}$$

$(P,D) = S(p_n, d_n) + LP(p_n, d_n)$ wherein:
P is a hypothesized pronunciation in the phoneme subsequence;
D is the pronunciation from the dictionary;
S(P, D) is the distance between P and D;
$S(p_i, d_j)$ is the score of phoneme string matching a given phoneme $p_i$ of P, and phoneme $d_j$ of D;
$C_{subs}(p_i, d_j)$ is the cost of substituting phoneme $p_i$ of P with phoneme $d_j$ of D;
$C_{del}(p_i)$ is the cost of deleting phoneme $p_i$ of P;
$C_{ins}(p_i)$ is the cost of inserting phoneme $d_j$ of D;
$LP(p_n, d_n)$ is the length penalty of decoded phoneme string $p_n$ matching pronunciation $d_n$.

29. A computer system as claimed in claim 28, wherein the ordering module further scores the list using a language model.

30. A computer system as claimed in claim 17, wherein the step of further processing includes a search module for using the alternative input words or phrases resulting from said step of expanding, searching an index of electronic documents for the alternative input words or phrases in response to the given input.

31. A computer system as claimed in claim 30, wherein the search module comprises:
a matching module for searching for an exact match of each alternative input word or phrase;
a proximity module for searching for a "proximate" match of each alternative input phrase;
an augmentation module for augmenting an indexer's score with a score associated with each alternative input word or phrase including a probability of the alternative input word or phrase and/or probability of a proximate match; and
a re-ranking module for re-ranking the electronic documents according to the augmented score.

32. A computer system comprising:
(a) means for expanding a given input and resulting in alternative input words or phrases, wherein the means for expanding includes:
means for translating words in the given input to one or more phoneme strings;
means for determining word boundaries in each of the phoneme strings to produce respective phoneme subsequences; and
for each produced phoneme subsequence, means for generating at least one confusable word phrase having a pronunciation which is acoustically similar to the phoneme subsequence, said confusable word phrase forming an alternative input word or phrase, said means for generating at least one confusable word phrase:
comparing each phoneme subsequence to word pronunciations from a dictionary, said comparing resulting in a list of words from the dictionary; and
ordering the list of words from the dictionary, the most likely word being at the top of the list, said ordering of the list including scoring the word pronunciation of each word in the dictionary against the phoneme subsequence using a distance metric based on the distance between a hypothesized pronunciation in the phoneme subsequence and the pronunciation from the dictionary; and
(b) means for searching an index of electronic documents for the alternative input words or phrases in response to the given input.

* * * * *

UNITED STATES PATENT AND TRADEMARK OFFICE
CERTIFICATE OF CORRECTION

PATENT NO.       : 7,089,188 B2
APPLICATION NO.  : 10/108534
DATED            : August 8, 2006
INVENTOR(S)      : Beth T. Logan et al.

It is certified that error appears in the above-identified patent and that said Letters Patent is hereby corrected as shown below:

In column 10, line 9, in Claim 10, delete "claim 10" and insert -- claim 1 --, therefor.

In column 10, line 32, in Claim 12, delete "$S(P,D)=S(p_n,d)+LP(p_n,d_n)$" and insert -- $S(P,D)=S(p_n,d_n)+LP(p_n,d_n)$ --, therefor.

In column 10, line 43, in Claim 12, delete "$C_{del(pi)}$" and insert -- $C_{del}(p_i)$ --, therefor.

In column 12, line 21, in Claim 28, delete "the" before "the distance".

In column 12, line 32, in Claim 28, delete "$(P,D)=S(p_n,d_n)+LP(p_n,d_n)$" and insert -- $S(P,D)=S(p_n,d_n)+LP(p_n,d_n)$ --, therefor.

In column 12, line 39, in Claim 28, delete "$d_{j\ of\ D;}$" and insert -- $d_j$ of D; --, therefor.

In column 12, line 43, in Claim 28, delete "$C_{ins}(p_i)$" and insert -- $C_{ins}(d_j)$ --, therefor.

Signed and Sealed this
Twenty-fifth Day of December, 2012

David J. Kappos
*Director of the United States Patent and Trademark Office*